United States Patent [19]

Campbell et al.

[11] Patent Number: 4,544,489

[45] Date of Patent: Oct. 1, 1985

[54] PROCESS AND APPARATUS FOR CONTROLLED ADDITION OF CONDITIONING MATERIAL TO SEWAGE SLUDGE

[75] Inventors: Herbert W. Campbell, Dundas; Phillip J. Crescuolo, Burlington, both of Canada

[73] Assignee: Canadian Patents and Development Limited, Ottawa, Canada

[21] Appl. No.: 626,799

[22] Filed: Jul. 2, 1984

[51] Int. Cl.⁴ .............................................. C02F 1/54
[52] U.S. Cl. .................................. 210/709; 210/739; 210/96.1; 137/92
[58] Field of Search ...................... 210/709, 96.1, 739; 137/92; 73/59

[56] References Cited

U.S. PATENT DOCUMENTS

| | | | |
|---|---|---|---|
| 3,605,775 | 9/1971 | Zaander et al. | 210/709 |
| 4,151,080 | 4/1979 | Zuckerman et al. | 210/96.1 |
| 4,159,248 | 6/1979 | Taylor et al. | 210/96.1 |
| 4,168,233 | 9/1979 | Anderson | 210/96.1 |
| 4,198,298 | 4/1980 | Zuckerman et al. | 210/739 |
| 4,282,093 | 8/1981 | Haga et al. | 210/709 |
| 4,282,103 | 8/1981 | Fuhr et al. | 210/709 |
| 4,283,938 | 8/1981 | Epper et al. | 137/92 |
| 4,299,119 | 11/1981 | Fitzgerald et al. | 73/59 |

FOREIGN PATENT DOCUMENTS 571284 9/1977 U.S.S.R. ............................ 210/96.1

OTHER PUBLICATIONS

Campbell, H. W. et al.; "The Use of Rheology for Sludge Characterization"; Water Science Tech., vol. 14, pp. 475-489 (1982).

Campbell, H. W. et al.; "Assessment of Sludge Conditionability Using Rheological Properties"; paper presented at workshop in Dublin; Jul. 6, 1983.

*Primary Examiner*—Benoit Castel
*Attorney, Agent, or Firm*—Hirons, Rogers & Scott

[57] ABSTRACT

The invention provides processes and apparatus for the controlled addition of conditioning (polymer) material to sewage sludge to improve its dewaterability. These materials are expensive and overdosage is to be avoided, while underdosage causes difficulty in sludge handling. The principal problem has been the absence of a system capable of continuous determination of proper dosage. It has been found that shear stress tests with a viscometer result in characteristics that exhibit a unique peak when dosage is adequate or above. A control system controlling the rate of pumping of the polymer to mix with the sludge is operative by measuring the shear stress and increasing the dosage in the absence of a peak. Upon detection of a peak the rate of decrease after the peak is also measured and used to resolve the potential ambiguity of whether dosage should be increased, decreased or remain steady. The viscometer can be of variable shear rate type, but it is found that the control system can also employ a simple fixed rate viscometer, the shear stress then being evaluated for peak and slope over a predetermined time interval. Specific control strategies are disclosed that will reduce the rate of change of dosage as the optimum is approached to avoid overshoot, and also to increase the time interval between tests to avoid unnecessary operation.

20 Claims, 10 Drawing Figures

FIG.1

FIG. 2  RHEOGRAMS OF POLYMER CONDITIONED SLUDGE

FIG. 6  THE EFFECT OF POLYMER DOSAGE OF SINGLE SHEAR RATE CURVES

FIG. 3 Effect of polymer dosage on rheology of sludge T (bench-scale).

FIG. 4 Effect of polymer dosage on rheology of sludge H (bench-scale).

FIG. 5 Effect of polymer dosage on rheology of sludge G (bench-scale).

FIG. 9  THE EFFECT OF AUTOMATIC CONTROL ON POLYMER DOSAGE

PROCESS AND APPARATUS FOR CONTROLLED ADDITION OF CONDITIONING MATERIAL TO SEWAGE SLUDGE

FIELD OF THE INVENTION

The present invention is concerned with improvements in or relating to processes and apparatus for the controlled addition of conditioning material to sewage sludge.

REVIEW OF THE PRIOR ART

Waste water treatment generates two end products; a treated liquid effluent and a solid residue normally present as a dilute suspension of low solids content (e.g. 3-7% by weight), referred to in the industry as "sludge". This sludge suspension requires further treatment and cannot normally be discarded in this form, but its processing is expensive. Consequently in large treatment plants the sludge invariably is concentrated or dewatered. Owing to the nature of sludges, particularly biological sludges, the dewatering rates are very slow unless the sludge is pre-conditioned with chemicals to flocculate the solids, current practice entailing widespread use of organic polyelectrolytes (referred to herein as polymers) for this purpose. Such polymers are quite effective but they represent a significant operation and maintenance cost; for example, the polymer costs for a sewage treatment plant intended to service a urban population of approximately 2 million (City of Montreal, Quebec, Canada) are likely in 1984 to be approximately $7 million dollars per year. Optimization of the polymer usage is therefore desirable as possibly generating substantial cost savings. The fundamental characteristics of the sludges and the associated water-binding mechanisms are poorly understood and hitherto the addition of the dewatering chemical has usually been made on the basis of a gross parameter, such as the total solids content, and usually is not adjusted during the day to take account of changes in either the incoming sludge concentration or its characteristics, so that there is a distinct possibility of the sludge being under-conditioned, which will deleteriously effect the dewatering and the quality of the sludge cake, or over-conditioned, resulting in wastage of the expensive conditioning polymers. It is therefore important from both cost and performance considerations to optimise the rate of addition of the conditioner to the sludge.

A variety of tests are available to measure the effectiveness of a particular conditioning chemical, including capillary suction time (CST), specific resistance to filtration, solids concentration, etc. Most of these procedures may be characterised as "laboratory-type", requiring skilled personnel for their operation and not adapted to continuous on-line measurement in the typical environment of a waste water treatment plant, where it is essential that the addition reflect fluctuations in the requirements of the sludge with time.

It has been disclosed in a paper presented by the inventors herein in Water, Science Technology, Volume 14, (1982), pages 475-489, following a conference held Mar. 29-Apr. 2, 1982 at Capetown, South Africa that rheological examination of an anaerobically digested sludge using a multi-speed viscometer showed that sewage sludge exhibits a non-Newtonian plastic or pseudoplastic flow, possessing a characteristic initial yield stress. The rheology of sewage sludge is complicated by the fact that most sludges are also thixotropic, possessing an internal structure which breaks down as a function of time and shear rate. Thus, a flow curve or rheogram of a typical sludge, showing the two curves produced by a rotating viscometer during an increasing and decreasing rate-of-shear cycle, indicates that the rheology of the sludge has been altered during the initial phase of the test with increasing rate of shear. The two curves are therefore displaced from one another, forming a hysteresis loop which is a measure of the degree of thixotropy exhibited by the sludge.

Such tests carried out on a sludge with different dosages of polymer, using an increasing shear rate, showed that an under-conditioned sludge exhibited a relatively smoothly increasing shear stress characteristic with increasing shear rate, from zero up to a rate at which turbulence occured and resulted in a suddenly increased slope of the curve. As the polymer dosage increased it was eventually found that curves were obtained in which, at the lower end of the shear rate scale, the shear stress increased very rapidly at first, and then suddenly reversed and decreased over a subsequent period, so that the curve exhibited a characteristic peak; thereafter the shear stress again increased progressively with a suddenly increasing slope as turbulence began. Further increases in polymer dosage progressively increased the peak value but without affecting its general positioning on the curve. It was found that the appearance of this characteristic peak, with the slope of the curve passing through zero, corresponded closely to an optimum polymer dosage. It was postulated that the increasing shear stress observed corresponded to increasing flocculation of the solids, with the peak corresponding to optimum flocculation and subsequent breakdown of the flocculated material with increasing shear rate.

It is an object of the present invention to provide a new process and apparatus for the controlled addition of conditioning material to sewage sludge employing rheological testing.

In accordance with the present invention there is provided a process for the controlled addition of dewatering conditioning material to a sewage sludge comprising the steps of (a) measuring with a viscometer the shear stress of the sludge to determine the existence or not of a predetermined maximum in the value of the measured shear stress representing a measured shear stress yield value;

(b) in the absence of detection of such a predetermined maximum value increasing the rate of addition of conditioning material to the sewage sludge;

(c) upon the detection of such a predetermined maximum value, measuring the rate of subsequent decrease of the measured shear stress immediately following the maximum value; and (d) increasing or decreasing or maintaining the rate of addition of conditioning material respectively as the rate of decrease is less than, or more than, or about equal to a predetermined rate of said subsequent decrease.

Also in accordance with the present invention there is provided apparatus for the controlled addition of dewatering conditioning material to a sewage sludge including:

(a) pump means for supplying a flow of sewage sludge at a predetermined rate of flow;

(b) controllable pump means for supplying a flow of conditioning material at a controlled rate of flow;

(c) means for mixing the flows of sewage sludge and conditioning material;

(d) a viscometer for measuring the shear stress of the sludge/material mixture and producing an output electric signal representative thereof;

(e) means operative to examine the viscometer output signal for the detection of a predetermined maximum value therein representing a measured shear stress yield value;

(f) control means responsive to the absence of such detection of a predetermined maximum value signal to control the said controllable pump means to increase the supply of conditioning material to the mixture;

(g) means operative to examine the viscometer output signal upon the detection of said predetermined maximum output value to determine the rate of subsequent decrease of the measured shear stress immediately following the maximum output value;

(h) the control means being responsive to the said rate of subsequent decrease of the measured shear stress to control the controllable pump means to increase the supply of conditioning material, or to decrease the supply of conditioning material, or to maintain the supply at its previous value as the rate of decrease is less than, or more than, or about equal to a predetermined rate of said decrease.

DESCRIPTION OF THE DRAWINGS

Processes and apparatus which are specific embodiments of the invention will now be described, by way of example, with reference to the accompanying diagrammatic drawings wherein.

DESCRIPTION OF THE PREFERRED EMBODIMENTS

Figure 1:
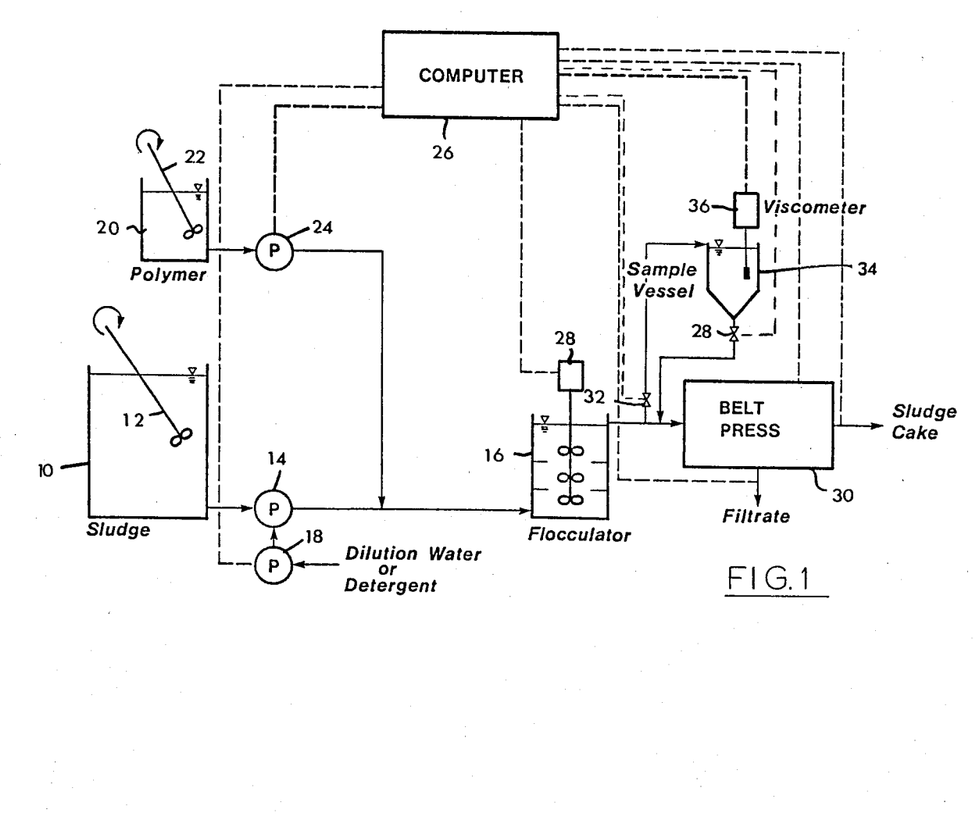
FIG. 1 is a schematic representation of a sludge dewatering system with controlled automatic addition of polymer conditioning material.

Referring now to FIG. 1, sludge delivered to a tank 10 is kept in suspended state by a stirrer 12. The contents of the tank are fed by a sludge pump 14 to a flocculator tank 16, dilution water or detergent being added if necessary by a second pump 18. It is standard practice in the industry to add the polymer in the form of a solution thereof; this solution is contained a tank 20 and maintained in agitated state by a stirrer 22. The liquid is fed by a controllable variable rate polymer feed pump 24 under the control of process computer 26 to the flocculator 16 where thorough mixing of the sludge and polymer takes place assisted by the action of computer controlled stirrer 28. It will be understood that the computer will not operate apparatus such as the pumps and stirrers directly, but will control the operations of the different parts of the apparatus via appropriate relays, switches and servo mechanisms. The mixed material is then fed to a belt press 30 which separates liquid from the sludge to result in the production of separate sludge cake and filtrate. At intervals determined by the process computer 26, as will be described below, an inlet valve 32 is opened and the conditioned sludge mixture is fed to a sample tank 34. When the tank is full the computer causes operation of a single shear rate viscometer 36 which, in accordance with the invention, measures the condition of the sludge for dewatering and feeds the resultant electric output signal to the computer by which it is evaluated and employed to control the rate of flow produced by polymer feed pump 24. Upon conclusion of the test an outlet valve 38 is opened by the computer and the sludge returns to the mainstream and is fed to the belt press. Other detecting equipment of the apparatus monitors parameters, such as the condition of the sludge cake and the filtrate, and have their output signals fed to the computer 26 via respective electric conductors. The computer also controls the operation of dilution water feed pump 18 and the flocculator stirrer 28 to ensure optimum results. It may be noted that at this time a belt press is the most-used form of dewatering apparatus, being employed in perhaps 70-75% of existing municipal sewage plants.

In most waste water treatment plants the polymer dosage is initially established on the basis of bench-scale dewatering tests such as the CST test, in which an open-ended cylinder is placed upon a standard sheet of chromatography paper and filled with sludge; the time in seconds taken for the liquid to spread a specific radial distance from the cylinder is found to be a measure of the dewatering capability of the sludge. In general CST times of less than 20 seconds are necessary for economical dewatering. Once this dosage (k/t or kg of polymer per dry metric tonne of sludge solids) has been selected, it is the common practice to operate at a constant addition rate until there is some gross visual indication, such as decreased performance, that the polymer dosage should be adjusted. The adjustment may be made on the basis of a new set of bench-scale tests, but more usually is simply made according to the operators' experience. It is well known that the polymer requirements for sludge conditioning change with time, due to either operating changes in the treatment plant or to uncontrollable inputs in the raw sewage for example during the fall season when food processing plants become operative. Unless a on-line sensor system is provided that will tell the operator that the polymer requirements are changing, either dewatering performance decreases or polymer over-dosing continues until the effects are visually obvious. Thus, it is probable that many polymer conditioning systems are operating at some level other than the optimum throughout their majority of the operating schedules.

Figure 2:
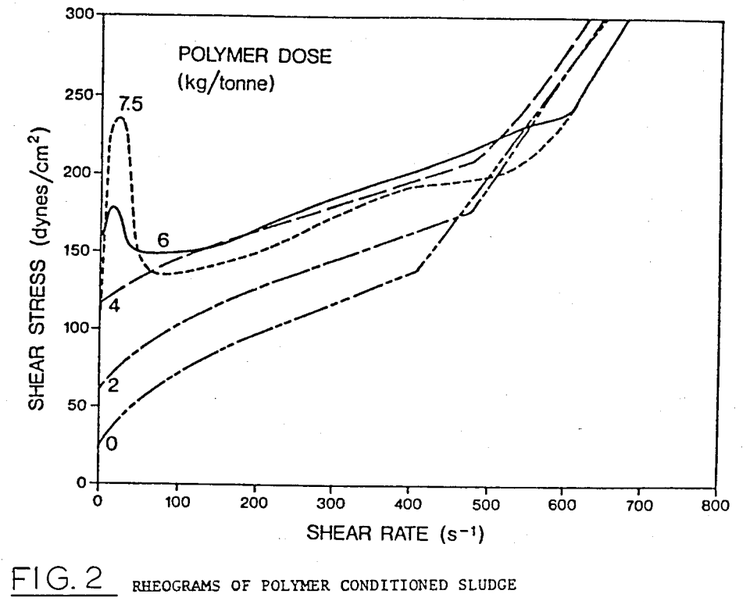
FIG. 2 is a graph of shear rate versus shear stress, as measured by a variable shear rate viscometer, and showing the effect of different polymer doses on the rheology of the sludge.

The rheogram of FIG. 2 shows shear stress versus shear rate curves, taken with a variable shear rate viscometer, for a typical sewage sludge dosed with different amounts of polymer, and shows that the shear stress increases with increasing polymer dose. At some polymer dose (6 kg/tonne in this example) a peak becomes evident in the rheogram, and the dosage at which this peak occurs is found to correlate well with the optimum dose required for efficient dewatering. It has been shown that the polymer dosage at which the peak occurs is sensitive to changes in solids concentration and sludge dewaterability, and these are the two principal parameters which vary at a full-scale treatment plant. It has also been shown that the general relationship between the rheological curves under and polymer addition is consistent for all sludges tested, with the actual amount of polymer required to produce the peak specific to the sludge.

Figure 3:
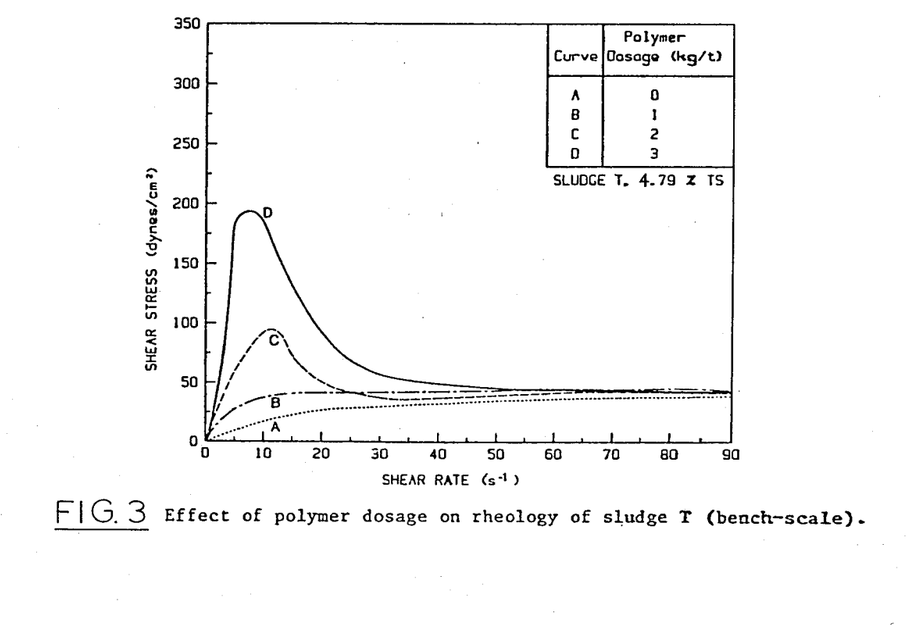
FIGS. 3, 4 and 5 are rheology graphs for three respective sludges, measured over the initial smaller rate of variable shear, and showing the effect of different polymer dosages thereon.
Figure 4:
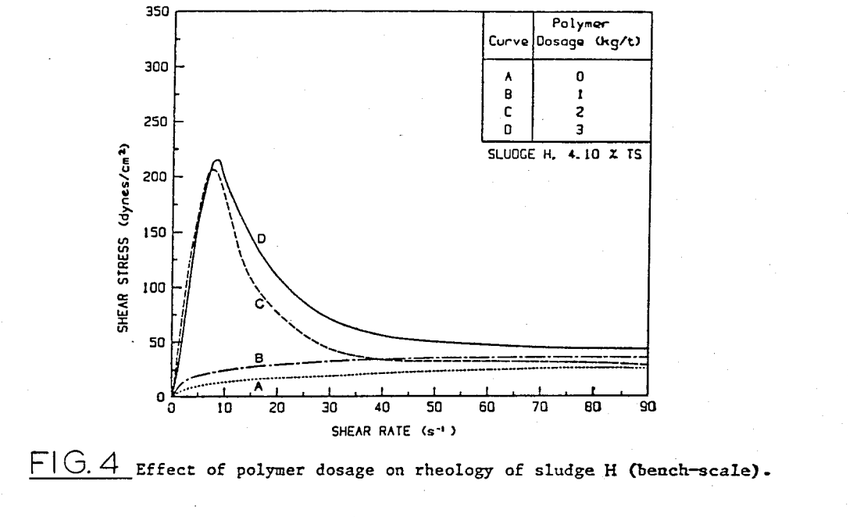
Figure 5:
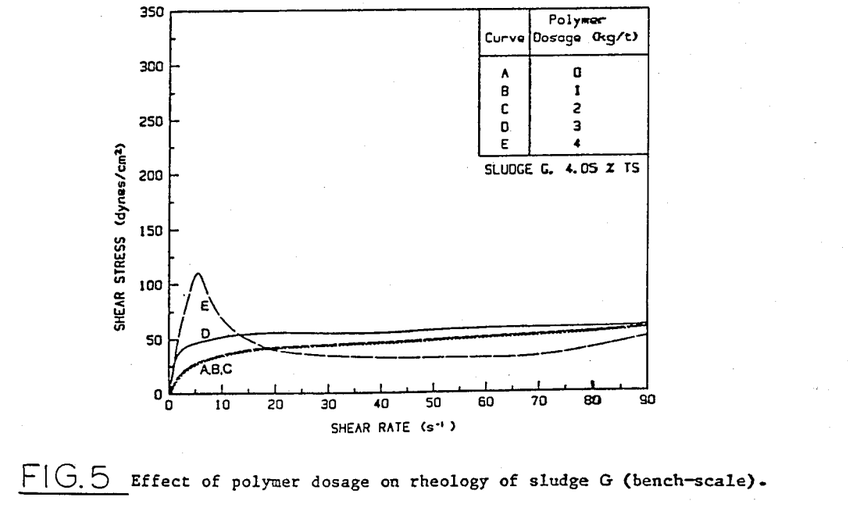

The sludges as used in the initial test work shown in FIGS. 2 to 5 were conditioned by adding a high molecular weight cationic polymer Praestol 429K (T.M. Dow) to 300 ml of sludge in a 1 liter Erlenmeyer flask. Initially the flask was inverted 20 times by hand to accomplish mixing, but subsequently this was done by mixing at 10 seconds at 1000 rpm using a standard stirrer developed by the Stevanage Water Research Centre, United Kingdom (WRC). This method has been accepted as a standard by the Commission of the European Communities for assessing the conditionability of a Municipal sewage sludge. All rheological measurements were made using a Haake Rotovisco rotational viscometer, comprising a coaxial system in which an inner cylinder rotates and an outer cup which holds the sample remains stationary; all measurements were carried out using a ribbed inner cylinder to minimize slippage and with a gap width of 2.5 mm. The sludge tested is relatively concentrated (3–6%) and the onset of turbulence occurred at a shear rate of 400–500 $s^{-1}$, being evident as a break in each curve and sudden increase in slope thereof. Examination of the rheograms obtained indicated that the area of interest with respect to conditioning was the initial portion of the curve up to approximately 100 rpm, and the graphs of FIGS. 3 to 5 are limited to this range. The conditioning sequence for the tests of FIGS. 3 to 5 consisted of adding the polymer over a 10 second interval during which the sludge was mixed using the WRC standard stirrer. The conditioned samples were immediately transferred to the viscometer where the rotor speed was increased from 0 to 100 rpm at the rate of 75 rpm/min. Examination of triplicate samples of unconditioned sludge (not illustrated) resulted in three curves lying exactly on the same line, indicating that the sludge was relatively homogeneous. At low polymer dosages (2.5 kg/t) the three curves were still very similar. As the polymer dosage increased to the point where the characteristic peak in the rheogram becomes evident, the three samples result in separate curves, indicating that this phenomenon cannot be attributed to any deficiency in the viscometer. Moreover, the results from sludges conditioned at low levels indicate that the reproducibility of the conditioning method is acceptable. Variation in the curves for highly conditioned sludge is to be expected, since the sludge becomes highly flocculated and it is then very difficult to ensure that a representative sub-sample has been obtained; the sludge no longer pours as a homogeneous mixture but rather as two distinct phases of water and aggregated solids. It will be noted that while the magnitude of the curves of fully conditioned sludge are different, they all exhibit the characteristic initial peak.

It is therefore possible to plot the derivative of the curve obtained for a particular sludge; the resulting parameter can be defined as the "instantaneous viscosity" and has viscosity as a unit thereof. This is possible since the tests made have shown that the most consistent behaviour observed is the development of an initial peak in the rheogram, even though a satisfactory explanation for this phenomenon has not yet been found. Regardless of the type of sludge or the solids concentration thereof the peak in the rheogram has invariably been found at some specific polymer dosage. In a commercial system for controlling the dosage of a specific sludge it is possible therefore to use a specific predetermined set peak value and specific predetermined set decreasing slope value after the peak value for control of polymer addition, since these parameters will accompany optimum dewatering. The absence of a peak indicates that dosage increase is required. The presence of a peak may show that the dosage is at or close to optimum but with ambiguity as to whether optimum has been achieved or increase or decrease is required; the measurement of the subsequent decreasing slope can be used to resolve this ambiguity. The presence of a peak with much higher slope than optimum shows that considerable over-dosing is present and should be corrected as soon as possible. Measurement of the decreasing slope value after the peak value is also required to ensure that a true peak has been obtained and not a spurious peak.

In producing the set of rheograms of FIGS. 3 to 5 the viscometer was interfaced with a mini-computer, which allowed control of various functions. In the specific test embodiment the sludge storage tank 10 was capable of holding approximately 1200 liters of sludge, and the sludge pump 14 was a variable speed positive displacement Moyno pump with a range of from 3 to 22 l/m. Solids concentration was varied by the addition of dilution water to the suction side of the sludge pump by means of the second pump 18. The initial operating procedure consisted of setting the sludge polymer and dilution water flow rates at the appropriate levels, waiting until an equilibrium condition had been achieved (approximately 5 flocculating tank retention times) and measuring the rheology of the conditioned sludge. During a run the computer collected data at a sampling frequency of 10 times per second for the initial 18 seconds and 4 times per second for the remainder of the run, storing the data in a file. Manipulation of this data file made it possible to regenerate the rheogram using expanded axes and also to develop the derivative of the flow curve (i.e. the instantaneous viscosity) by simply calculating the slope between each consecutive pair of data points. An abrupt change in the derivative from positive to negative (typically at approximately 3 $s^{-1}$) indicates the presence of a peak in the rheogram. A computer search within prescribed boundary conditions of the derivative data file identifies that a condition of zero slope exists and that therefore a necessary requirement for optimal conditioning, i.e. a peak in the rheogram, must have been satisfied. Table 1 below gives sludge characterisation data for the three sludges T, H and G shown respectively in FIGS. 3, 4 and 5. All CST tests were conducted using a 10 ml diameter reservoir. The centrifuge cake solids were determined by spinning samples of sludge in a laboratory centrifuge for 2 minutes at approximately 1000 G's, decanting the supernatant and analyzing the remaining cake for total solids content.

TABLE 1

| Sludge Characterization Data | | |
|---|---|---|
| Polymer Dosage (kg/t) | CST (s) | Centrifuge Cake Solids (%) |
| SLUDGE T, 4.79% TS | | |

TABLE 1-continued

| Sludge Characterization Data | | |
|---|---|---|
| Polymer Dosage (kg/t) | CST (s) | Centrifuge Cake Solids (%) |
| 0 | 2000 | 6.1 |
| 1 | 97 | 8.9 |
| 2 | 16 | 10.4 |
| 2.5 | 17 | 12.3 |
| SLUDGE H, 4.10% TS | | |
| 0 | 544 | 7.0 |
| 1 | 27 | 11.0 |
| 2 | 14 | 12.3 |
| 3 | 14 | 12.0 |
| SLUDGE G, 4.05% TS | | |
| 0 | 1373 | 5.0 |
| 1 | 735 | 6.6 |
| 2 | 537 | 7.8 |
| 3 | 153 | 6.9 |
| 4 | 20 | 9.5 |

It will be noted that the sludges have different responses to polymer dosage but all exhibit the characteristic peak in the curve upon the addition of sufficient polymer. Sludges T and H show a dramatic decrease in CST values with the addition of small amounts of polymer, while sludge G shows a much more gradual reduction, almost linear, with increasing polymer addition. It may be assumed that a CST value in the range of 10–20 seconds represents a super flocculated sludge, and this is a condition which must normally be satisfied for dewatering by a belt press. Reference to Table 1 indicates that on this basis (CST $\geq$ 20 seconds) super flocculation of all three sludges was achieved, but at different polymer dosages.

The trend of increasing centrifuge cake solids with increasing polymer dosage is, in general, consistent for all sludges. Once again however, sludge G is unique in the fact that maximum cake solids achieved (9.5%) were significantly less than those for the other sludges (12.3%). It is apparent therefore that sludge G must have some inherent characteristics which result in a different response to polymer addition than that observed for sludges T and H. Although the specific nature of the differences between sludges is not known, it is clear that the rheology is an adequate means of describing the effect of sludge characteristics on conditioning requirements. The rheological data is also compatible with other measures of dewaterability such as CST and centrifuge cake solids. On a micro-scale there are a wide variety of sludge parameters that may vary over time, but on a macro-scale there are only two gross parameters that may change, namely, solids concentration and sludge dewaterability. Any measurement intended for use in process control must therefore be sensitive to changes in these gross parameters.

The solids concentration was observed to have a small effect on the amount of polymer required to produce a peak in the rheogram. For example, sludge T required 2.0 kg/t of polymer to produce the peak at 3.3% total solids, while at a much higher concentration of 7.6% total solids the polymer dosage required was between 2.0 and 3.0 kg/t. This phenomenon is attributed to the difficulty of dispersing the polymer uniformly through sludges of higher concentrations.

Figure 6:
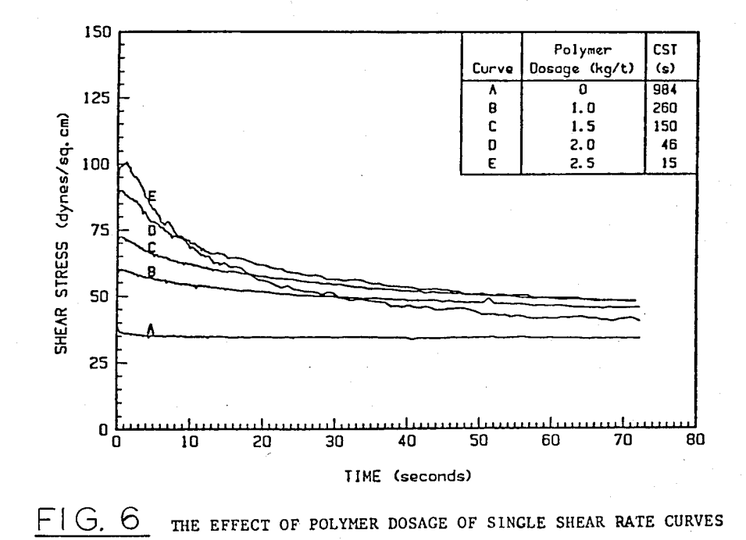
FIG. 6 is a graph of shear stress against time in seconds as measured by a single shear rate (speed of rotation) viscometer, and showing the effect of different polymer dosages on the shear stress.

The rheological curves shown in FIGS. 3 to 5 were generated by measuring the shear stress while increasing the viscometer rotor at a predetermined rate, from 0 to 100 rpm, and each can be referred to as a total flow curve. This requires a viscometer with programmable speed control and results in the equipment being both expensive and relatively sophisticated, also requiring operators with laboratory training not normally found in waste water treatment plants. It has been found that tests conducted with the viscometer operating at a single uniform speed, i.e. constant shear rate, can be employed and are more appropriate to in-plant waste water treatment operations. For example, such tests were conducted at a shear rate of $10s^{-1}$ (10 rpm) for a period of 70 seconds and a typical set of results for different dosages are shown in FIG. 6.

The sensor system can comprise a viscometer 36 having its rotor immersed directly in the sludge (without a surrounding cup) and driven at constant speed so as to obtain a constant shear rate over the elapsed time. Under this single shear rate condition versus time a Newtonian fluid would cause the production of a straight horizontal line. The sludge is thixotropic and there is therefore an internal structure which tends to deteriorate under applied stress. For an unconditioned sludge (curve A) there is an initial very slight maximum shear stress and then a slow decrease as the particles start to break down. The addition of polymer accentuates this behaviour, so that both the initial shear stress and the slope over the first 10 seconds increase as the polymer dosage increases. It is found therefore that single shear rate curves of the kind illustrated in FIG. 6 are also effective in relating changes in sludge characteristics to conditioning requirements.

Figure 7A:
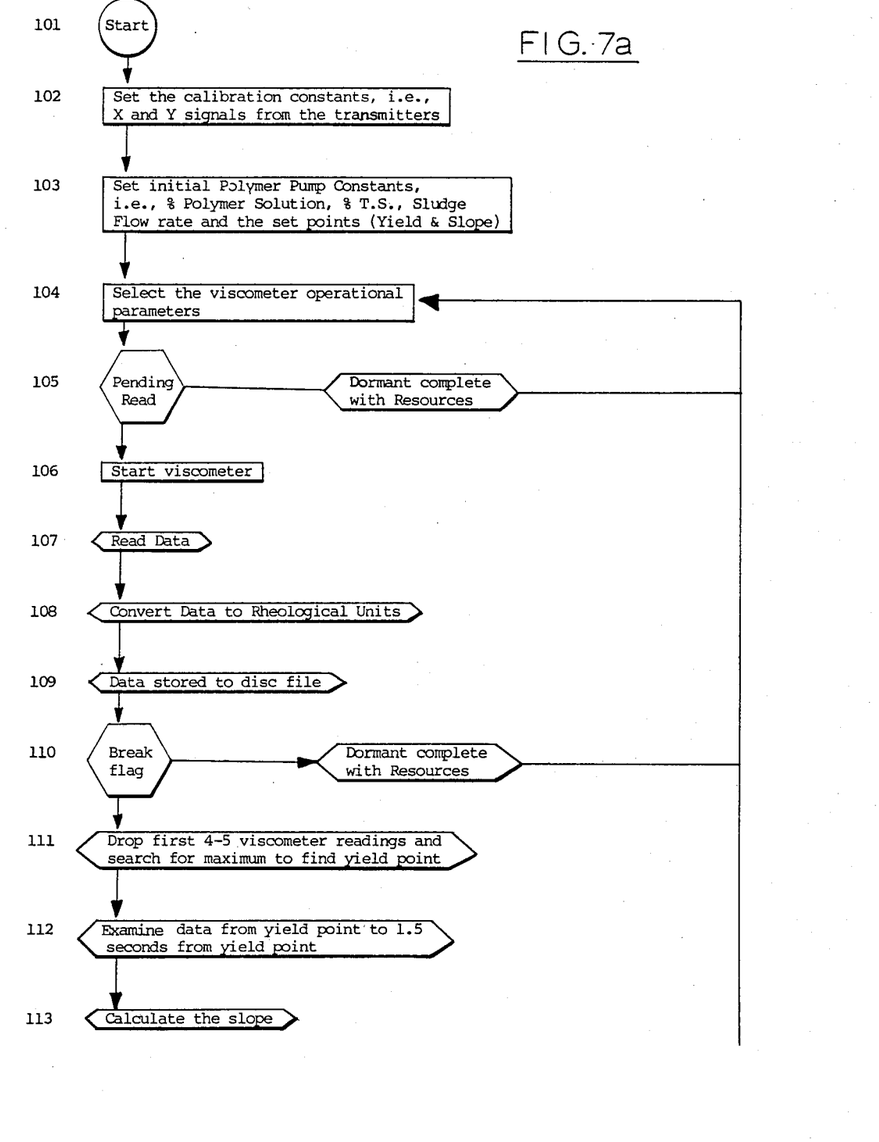
FIGS. 7a and 7b together are a logic flow diagram of a control system employed by the apparatus of FIG. 1.
Figure 7B:
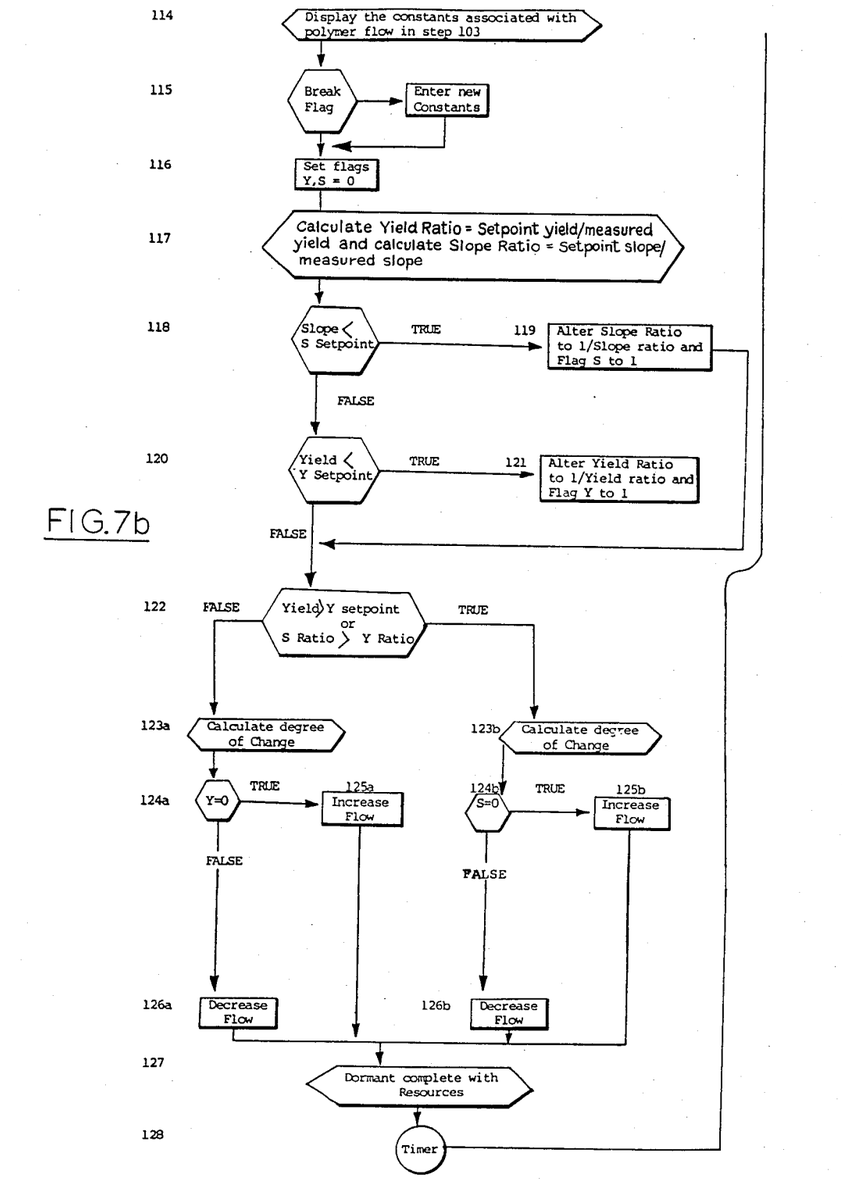

The control strategy that can therefore be employed, as illustrated by the logic flow diagram of FIGS. 7a and 7b, utilizes the characteristics of such a single shear rate curve together with the computer. The viscometer and polymer feed pump are interfaced with the computer such that data from the viscometer run is used by the control algorithm to automatically adjust the polymer flow rate. A tentative optimum polymer dosage is identified on the basis of bench CST tests (i.e. less than 20 seconds) and the characteristics of the particular rheogram corresponding to that polymer dosage are then used to establish control set points, namely yield set point and slope set point. With reference to curve E in FIG. 6, for example, this means that the maximum shear stress (100 dynes/sq.cm) and the initial slope (from 1–10 seconds) of curve E (CST = 15 seconds) would represent two set points which the computer would attempt to maintain.

Referring now specifically to the logic flow diagram of FIGS. 7a and 7b, upon start-up of the system by the computer at step 101 the calibration constants for the apparatus are set at step 102 so as to ensure that the signals received from the various transmitters of the apparatus can be accepted by the remainder thereof.

At step 103 the anticipated required constants are set for parts of the apparatus such the polymer pump (i.e. to determine the rate of supply of the polymer solution fed to the sludge), the anticipated total solids percentage of the sludge, the sludge flow rate to be employed, and the set points which have been established for yield and slope for the particular sludge to be conditioned. As a specific example, the set points for a typical sludge were 7 pascals for the yield point and 3 pascals per second for the slope.

At step 104 the operational parameters of the viscometer are selected, while step 105 is a holding step of at least the length required for the viscometer sample tank to fill with sludge. At this step if necessary the run can be aborted with all of the preset parameters saved with a return to step 104.

The process then continues to step 106 which starts the operation of the viscometer; the data is then read at step 107 and at step 108 the data obtained from the viscometer is converted to rheological units. At step 109 this data is stored in the computer memory. Step 110 provides the possibility of a break after the period required for a single viscometer run. The viscometer stops at this step with all parameters saved and a loop is provided to step 104, which will therefore permit viscometer runs to be carried out without subsequent control of the process. This may be required for example, in setting up the viscometer for operation, or for independent testing the viscometer in the event that some malfunction of the control system has been noted and it is desired to determine whether or not the viscometer is at fault.

With the process control in operation the system moves to step 111 at which the readings obtained from the viscometer 36 are examined to search for a maximum and thereby establish the yield point value for the particular conditioned sludge. The system is arranged to disregard or otherwise not to evaluate the first 4–5 of the viscometer readings which occur during the initial acceleration of the viscometer, during which the spring of the viscometer may cause production of a spurious maximum. Thus, the computer finds the yield point maximum by comparison of each reading with the immediately preceding reading, and identifies the maximum value as that reading which is followed by two successive lower readings. Such a maximum reading can also be obtained during acceleration of the viscometer rotor as a result of the loading and unloading of the viscometer spring, and it is essential that such a spurious reading be ignored.

At step 112 data in the memory is examined from the determined yield point maximum for a period of 1.5 seconds thereafter, which is adequate time to provide enough subsequent readings for calculation of decreasing shear slope from the yield point maximum. The slope is then calculated at step 113.

At step 114 the system displays the constants associated with the polymer flow from step 103 and gives the operator the opportunity to change if some change is required, this change being permitted by the break flag 115 at which new constants can be entered. Thus by the time step 115 is reached the operator has usually had the opportunity of examining the rheogram, and can determine more surely whether or not the constants previously set are appropriate for optimum operation of the process; if not adjustment can now be made. Another purpose for step 115 will be described below.

At step 116 the system is reset so that system "flag" constants for yield and slope are set at the value 0, as will be explained below. At step 117 the system calculates what is called for convenience the yield ratio, namely the set point yield divided by the measured yield, and the slope ratio which is the set point slope divided by the measured slope. Step 118 involves an "if" statement which compares measured slope with set point slope; if measured slope is less than set point slope for a true statement then the system moves to step 119, while if the statement is false the system moves to step 120.

At step 119 the slope ratio is converted to the reciprocal of the slope ratio for reasons explained below, and the flag value from step 116 is now set at 1. Steps 120 and 121 perform the same operation for the yield; if a true statement is obtained then at step 121 the yield ratio is converted to the reciprocal of the yield ratio and the flag previously set at 0 at step 116 is now changed to 1.

At step 122 the system examines two alternative "if" statements of whether measured yield is greater than set point yield, or whether the slope ratio is greater than the yield ratio. If both statements are false the system moves to step 123a while if either statement is true then the system moves to step 123b.

The reason for prior steps 117 to 122 is that in a commercial system it is desirable to not only automatically increase or decrease the addition of the conditioning polymer to the sludge, but also to be able to control the rate at which the polymer dosage is changed. Thus, if upon initial measurement it is found that the sludge is considerably underconditioned then it is desired to make a relatively large change in polymer dosage, whereas if only a small correction is required the system will make only a correspondingly small change in the dosage rate, so that the production of properly conditioned sludge is optimized as quickly as possible and yet the system does not over-correct when it is at or close to optimum.

Figure 8:
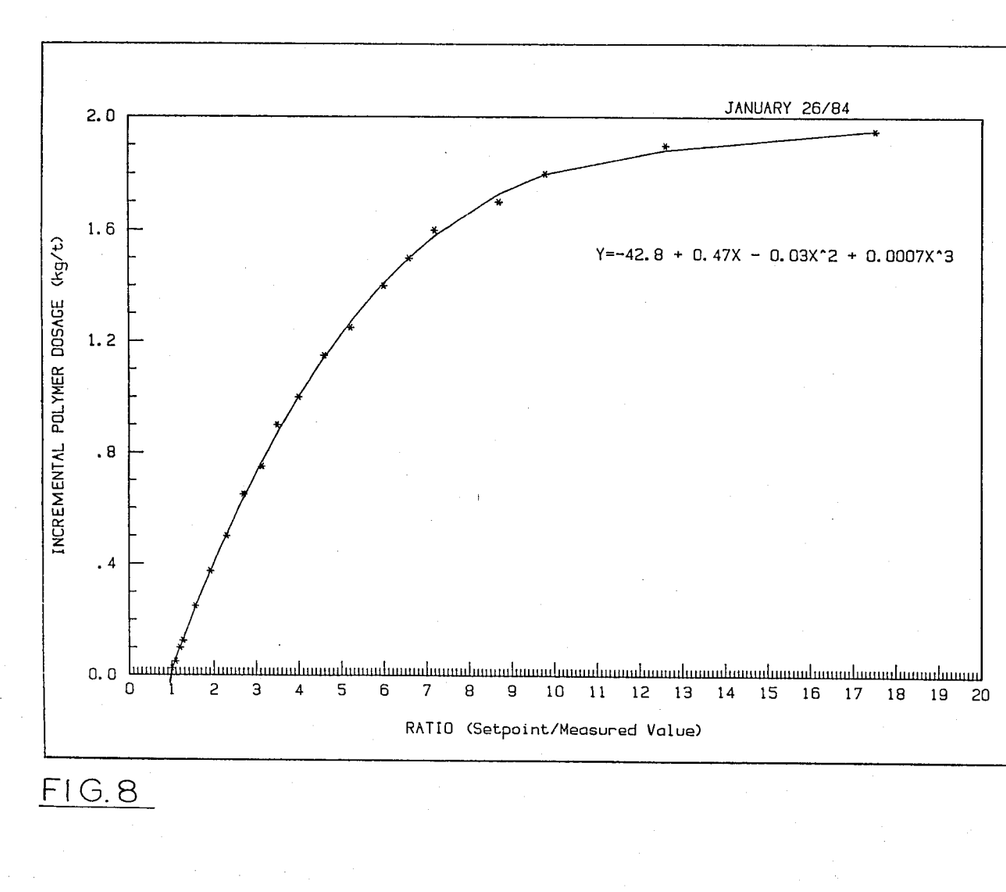
FIG. 8 is a graph employed for determination of incremental polymer dosage, as employed with the system of FIGS. 7a and 7b.

At steps 123a and 123b the required degree of change is calculated and the rate of change required is calculated using for example a curve as shown in FIG. 8. The function on which the curve is based crosses the ratio axis at 1, corresponding of course to zero change without ambiguity in function, which means that the system is unable to manipulate ratio values of less than 1. Accordingly, if it is found in steps 118 and 120 that the respective ratios are less than 1, conversion is made to the reciprocal which will give a value greater than 1, which the system can then manipulate.

Step 124a is another "if" statement which examines the flag yield value fed to it. Thus, the yield flag was set at step 116 at 0 and if this has not been changed as a result of steps 120 and 121, then it will remain at 0. If therefore at step 124a the value is still 0 a true statement is obtained and the system will progress to step 125a and increase the flow of polymer by the required incremental amount value. If however at step 120 a true statement was obtained, then the value for y will now be 1 and at step 124a the comparison will result in a false statement whereupon the system will progress to step 126a and decrease the polymer flow by the required incremental amount. Thus, the rate of polymer flow will now be increased or decreased in accordance with the curve of FIG. 8, corresponding to step 123a. If this ratio is one then of course the system remains constant and no change takes place. As a specific example if it is assumed at step 118 that the measured slope is 6 whereas the set point slope is 3, the statement is false so that the system immediately moves to step 120. If on the other hand the set slope is 6 and the measured slope is 3, then a true statement is obtained at step 118 and step 119 is effective. The ratio obtained at step 118 is 0.5 and the corresponding reciprocal ratio obtained at step 119 is 2 which, from the characteristic curve of FIG. 8 results in an increase in polymer dosage of 0.25. The operation of the system when comparing measured yield and set point yield will be apparent.

At step 127 the system becomes dormant with all resources saved so that it can return at step 104 to display the operational parameters, and does not need to return to step 103.

Step 128 is a timing step which is also controlled in accordance with the magnitude of the incremental polymer dosage, whether an increase or a decrease. Thus, if the operation of the system has shown that a large change ws required, then the system will repeat its rheological evaluation at a relatively short interval of time, as short as 2 minutes, which is the normal time required for a complete cycle of operation of the control system. However, if only a small or zero increment or decrement has taken place then the system will not repeat until a longer interval (perhaps 30 minutes) has elapsed, so that the control system does not operate unnecessarily.

Figure 9:
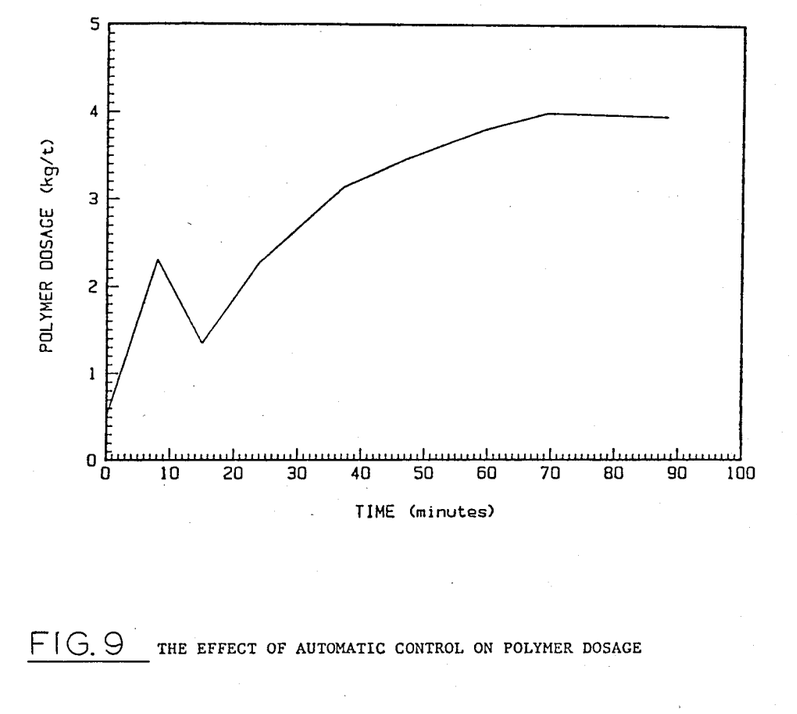
FIG. 9 is a graph to show which shows the typical effect of automatic control on polymer dosage with the system of FIGS. 7a and 7b.

FIG. 9 shows a control curve that has been obtained upon automatically controlling polymer dosage. It had been determined that the optimum polymer dosage for the sludge in question was approximately 4 kg/t. The test run was initiated at a dosage of 0.5 kg/t and the control system allowed to determine the optimum. Viscometer tests were conducted manually at 5 to 10 minute intervals; based on this input to the control algorithm, polymer dosage was increased from the initial 0.5 kg/t to 4.0 kg/t over a period of 70 minutes, employing the ratio table shown in FIG. 7. For example, with a ratio of set point to measured value of perhaps 10, then the incremental polymer dosage that is permitted is approximately 1.8. However, if the ratio is at the lower value of 5, then the incremental polymer dosage that is permitted is only 1.2.

We claim

1. A process for the controlled addition of dewatering conditioning polymer material to a sewage sludge to produce a mixture thereof comprising the steps of:
    (a) measuring with a viscometer in a quantity of the sludge/material mixture the value of the shear stress in the said quantity of the mixture to determine the existence or not of a predetermined maximum in the value of the measured shear stress representing a measured shear stress yield value;
    (b) in the absence of detection of such a predetermined maximum value increasing the rate of addition of conditioning polymer material to the mixture;
    (c) upon the detection of such a predetermined maximum value, measuring the rate of subsequent decrease of the measured shear stress immediately following the maximum value; and
    (d) increasing or decreasing or maintaining the rate of addition of conditioning polymer material respectively as the rate of decrease is less than, or more than, or about equal to a predetermined rate of said subsequent decrease.

2. Process as claimed in claim 1, wherein the viscometer is of the rotational cylinder type and measures the shear stress at increasing rate of rotation of the cylinder.

3. Process as claimed in claim 1, wherein the viscometer is of the rotational cylinder type and measures the shear stress at a constant speed of rotation over a period of time.

4. Process as claimed in claim 1, wherein the incremental rate of increase or decrease of the addition of the conditioning polymer material is adjusted to decrease as the measured shear stress maximum value and the measured rate of subsequent decrease approach the predetermined values.

5. Process as claimed in claim 1, wherein the time interval between successive viscometer measurements is adjustable to decrease with the incremental rate of decrease of the rate of feed of conditioning polymer material and to increase with the incremental rate of increase of the rate of feed of conditioning polymer material.

6. Process as claimed in claim 3, wherein the viscometer is of spring loaded rotational cylinder type and the initial portion of the signal obtained therefrom is ignored to avoid variation in the signal caused by loading and unloading of the spring.

7. Process as claimed in claim 1, including the steps of:
    (a) obtaining the said quantity of the mixture by withdrawing a sample of mixed sludge and conditioning polymer material to a separate vessel;
    (b) measuring the shear stress of the sample in the vessel; and
    (c) thereafter returning the mixture sample to the mixture for subsequent dewatering.

8. Process as claimed in claim 1, including the steps of:
    (a) establishing for the measured shear stress of the mixture a set point maximum yield value and a set point slope value;
    (b) measuring the yield value and the slope value for the said mixture;
    (c) determining the yield ratio of measured yield value to set point yield value and the slope ratio of measured slope value to set point slope value;
    (d) increasing the dosage rate of conditioning polymer material if the measured yield value is less than the set point yield value and the measured slope value is less than the set point slope value; or
    (e) decreasing the dosage rate of conditioning polymer material if the measured yield value is greater than the set point yield value or if the measured slope is greater than the set point slope value.

9. Process as claimed in claim 8, wherein the incremental rate of increase or decrease of the addition of the conditioning polymer material to the mixture is adjusted to decrease as the measured shear stress maximum value and the measured value of the rate of subsequent decrease approach the predetermined values.

10. Process as claimed in claim 9, wherein when the yield ratio is less than one the reciprocal of the yield is employed to determine the incremental rate of change of addition of the conditioning polymer material to the mixture, and when the slope ratio is less than one the reciprocal of the slope ratio is employed to determine the incremental rate of change of addition of the conditioning polymer material to the mixture.

11. Apparatus for the controlled addition of dewatering conditioning polymer material to a sewage sludge to produce a mixture thereof including:
    (a) pump means including conduit means for supplying a flow of sewage sludge at predetermined rate of flow to a container therefor;
    (b) controllable pump means including conduit means for supplying a flow of conditioning polymer material at a controlled rate of flow to said container;
    (c) means for mixing the said flows of sewage sludge and conditioning material to produce a sludge/polymer material mixture;
    (d) a viscometer insertable into a quantity of the sludge/polymer material mixture for measuring the shear stress of the sludge/material mixture and producing an output electric signal representative thereof;

(e) means operative to examine the viscometer output electric signal for the detection of a predetermined maximum value therein representing a measured shear stress yield value;

(f) control means responsive to the absence of such detection of a predetermined maximum value signal to control the said controllable pump means to increase the supply of conditioning polymer material to the sludge/polymer material mixture;

(g) means operative to examine the viscometer output electric signal upon the detection of said predetermined maximum output value to determine the value of the rate of subsequent decrease of the measured shear stress immediately following the maximum output value;

(h) the control means being responsive to the said value of the rate of subsequent decrease of the measured shear stress to control the controllable pump means to increase the supply of conditioning polymer material to the mixture, or to decrease the supply of conditioning polymer material to the mixture, or to maintain the supply of the conditioning polymer material to the mixture at its previous value as the value of the rate of decrease is less than, or more than, or about equal to a predetermined value of the rate of said decrease.

12. Apparatus as claimed in claim 11, wherein the viscometer is of the rotational cylinder type and measures the shear stress at increasing rate of rotation of the cylinder.

13. Apparatus as claimed in claim 11, wherein the viscometer is of the rotational cylinder type and measures the shear stress at a constant speed of rotation over a period of time.

14. Apparatus as claimed in claim 11, wherein the control means is operative so that the value of the incremental rate of increase or decrease of the addition of the conditioning polymer material to the mixture is adjusted to decrease as the measured shear stress maximum value and the measured value of the rate of subsequent decrease approach the predetermined values.

15. Apparatus as claimed in claim 11, wherein the control means is operative so that the time interval between successive viscometer measurements is adjustable to decrease with the value of the incremental rate of decrease of the rate of feed of conditioning polymer material to the mixture and to increase with the value of the incremental rate of increase of the rate of feed of conditioning polymer material to the mixture.

16. Apparatus as claimed in claim 13, wherein the viscometer is of spring loaded rotational cylinder type and the initial portion of the signal obtained therefrom is ignored to avoid variation in the signal caused by loading and unloading of the spring.

17. Apparatus as claimed in claim 11, including:
(a) a sample vessel, and
(b) conduit means for withdrawing a sample of mixed sludge and polymer material from the mixture thereof to the sample vessel and for returning the sample to the mixture;
the apparatus including means for measuring the shear stress value of the sample in the sample vessel; and means for
thereafter returning the sample to the mixture for subsequent dewatering.

18. Apparatus as claimed in claim 11, further comprising
(a) means for establishing for the measured shear stress of the mixture a set point maximum yield value and a set point slope value;
(b) means for measuring the yield value and the slope value for the said quantity of mixture;
(c) means for determining the yield ratio of measured yield value to set point yield value and the slope ratio of measured slope value to set point slope value;
(d) means for increasing the dosage rate of conditioning polymer material if the measured yield value is less than the set point yield value and the measured slope value is less than the set point slope value; or
(e) means for decreasing the dosage rate of conditioning polymer material if the measured yield value is greater than the set point yield value or if the measured slope value is greater than the set point slope value.

19. Apparatus as claimed in claim 18, wherein the control means includes means operative so that the incremental rate of increase or decrease of the addition of the conditioning polymer material to the mixture is adjusted to decrease as the measured shear stress maximum value and the measured value of the rate of subsequent decrease approach the predetermined values.

20. Apparatus as claimed in claim 19, wherein when the yield ratio is less than one the reciprocal of the yield ratio is employed to determine the incremental rate of change of addition of the conditioning polymer material to the mixture, and when the slope ratio is less than one the reciprocal of the slope ratio is employed to determine the incremental rate of change of addition of the conditioning polymer material to the mixture.

* * * * *